UNITED STATES PATENT OFFICE 2,139,013

PIGMENTS

Worthington T. Grace, Willoughby, and Albert H. Ristau, Cleveland, Ohio, assignors to E. I. du Pont de Nemours & Company, Wilmington, Del., a corporation of Delaware No Drawing. Application March 3, 1937, Serial No. 128,790

7 Claims. (Cl. 134—78)

This invention relates to pigments, and is particularly directed to processes for improving the pigment properties of leaded zinc oxides, comprising making a mixture containing a leaded zinc oxide and a phosphatic substance and calcining the mixture in a furnace having a non-siliceous lining, and to the novel leaded zinc oxide pigments produced.

A pigment, in order to find general acceptance in the paint industry, must be capable of being readily prepared in a form in which it may be easily and completely dispersed in the drying oils commonly used as paint vehicles. A pigment with a soft, smooth texture is particularly adaptable to such dispersion. Crystalline materials or substances containing hard agglomerates are, of course, entirely unsuitable. The pigment must not settle rapidly in the vehicle, and when it does settle, as upon long standing, it must be capable of being easily redispersed with a minimum of stirring. With respect to these requirements, zinc oxide and sublimed white lead are well qualified.

The use of zinc oxide alone as the pigment of a paint is unfortunately attended by serious difficulties, particularly when the paint is subjected to outdoor exposure. These difficulties are caused by a tendency of the zinc oxide to promote excessive hardening with a resultant decrease in the elasticity of the paint film. A non-elastic paint film shows premature failure in such forms as cracking, checking, curling and peeling.

A convenient way to counteract this tendency of zinc oxide to harden paint films is by the addition of lead compounds to the paint. Lead compounds usually increase the elasticity of the film. Most of the common lead pigments have been found to have a corrective effect on the elasticity of zinc oxide paint films, but the lead compounds most generally used for the purpose have been the basic sulfates. Pigments containing basic lead sulfates are known commercially as leaded zinc oxides.

It is customary in the pigment industry to indicate the proportion of lead compounds in a leaded zinc oxide in terms of per cent. For instance, a 35% leaded zinc oxide contains such an amount of basic lead sulfates that when all the lead in a given weight of sample is converted to lead sulfate, $PbSO_4$, the weight of lead sulfate obtained is 35% of the original weight of sample. The 5, 35, and 50% leaded zinc oxides have been the ones most widely used as pigments. Processes have been developed whereby leaded zinc oxides have been produced directly, instead of first making a lead-free zinc oxide and blending in the lead compounds subsequently.

Calcination of zinc oxide under proper conditions usually produces an improvement in certain of its pigment properties. Its color is often considerably improved. When zinc oxide is calcined the relatively smaller particles, called "fines", are either agglomerated or fumed and condensed giving, in any event, a product whose individual particles are of approximately uniform size. Eliminating the fines usually has the effect of increasing the durability of paints in which the calcined pigment is used.

The advantages obtainable by calcining zinc oxide have not heretofore been attained by calcining leaded zinc oxide. On the contrary, the pigment properties of leaded zinc oxide have been detrimentally affected by calcination according to the methods usually used for zinc oxide. Proper calcination requires the use of temperatures ranging from about 600° to about 700° C. At such temperatures the lead compounds in a leaded zinc oxide form a fused slag with the materials heretofore used as linings in the calcining furnaces. Formation of this slag is of course very undesirable. It converts the basic lead sulfates into compounds which are without value as paint pigments and which have no softening effect on a paint film. The beneficial effects of adding basic lead sulfate to zinc oxide are therefore lost if the leaded zinc oxide is calcined. The formation of slag is, of course, accompanied by a corresponding deterioration of the calcining furnace, making frequent and expensive repairs necessary.

The presence of particles of slag makes the texture of a calcined leaded zinc oxide coarse and gritty. In addition to the slag particles, however, other coarse, gritty particles are also present which can not be identified as slag, but are, rather, relatively large agglomerates of a mixture of basic lead sulfate and zinc oxide. Gritty particles, regardless of composition, cannot be tolerated in a paint pigment. Because of the formation of slag and coarse agglomerates, calcination of leaded zinc oxide has heretofore been considered undesirable.

We have now found that the difficulties which have hitherto rendered calcination of leaded zinc oxide impractical may be overcome by adding a phosphatic substance to the leaded zinc oxides and calcining the mixture in a furnace having a non-siliceous refractory lining. By our novel processes we have produced a calcined leaded zinc oxide free from slag contaminaiton, having a smooth, grit-free texture, and showing a substantial color improvement when compared with the uncalcined product.

In the processes of our invention we avoid slag contamination of the leaded zinc oxide by carrying out the calcination in a furnace having a non-siliceous refractory lining. We have found that the basic lead sulfates in a leaded zinc oxide form a reaction or fusion product with the silicates or silica in common clay firebrick. This reaction or fusion product is the undesirable slag heretofore found in calcined leaded zinc oxides. By employing a non-siliceous lining in the calcining furnace, therefore, we remove one of the constituents necessary for slag formation.

A pigment of satisfactory texture is not obtained by calcining leaded zinc oxide, however, even when slag contamination is avoided. The product still contains gritty particles which do not readily disperse in a paint vehicle. These gritty particles are probably large agglomerates of smaller basic lead sulfate and zinc oxide particles, but whatever their nature, their presence is definitely undesirable in a pigment. While these agglomerates might be removed, as for instance, by mechanical separation, such procedures would be uneconomical and obviously it would be better to avoid their formation in the first instance.

We have found that the formation of gritty particles, other than slag, during calcination of a leaded zinc oxide can be avoided by adding a phosphatic substance to the leaded zinc oxide prior to or during calcination. The phosphatic substance prevents excessive agglomeration of the basic lead sulfate and zinc oxide particles, with the result that a calcined product having a soft, smooth texture is obtained.

By adding a phosphatic substance to a leaded zinc oxide and calcining the mixture in a furnace having a non-siliceous lining, in accordance with our invention, a product is obtained which is free from slag contamination, has a smooth, grit-free texture, and has a color substantially better than the uncalcined material.

The non-siliceous furnace lining used in the processes of our invention is unattacked by leaded zinc oxide even at the elevated temperatures used in the calcination. Since slag formation is thus avoided, the basic lead sulfates in the leaded zinc oxide retain their original pigment qualities and their property of improving the elasticity of zinc oxide paint films. Also, since non-siliceous furnace linings are not subject to the deterioration accompanying slag formation, the necessity of frequent repairs to the calcining furnace is avoided and the cost of calcining leaded zinc oxide is appreciably reduced.

The color of a leaded zinc oxide is remarkably whitened by calcination according to the processes of our invention. Improvements have heretofore been achieved by calcination in the case of substantially lead-free zinc oxide, but as has been pointed out above, the benefits of calcination have not heretofore been obtainable with leaded zinc oxide.

The processes of our invention and their application to the production of improved pigments may be more clearly understood from the following specific examples.

The first example illustrates the improvement obtained in the pigment properties of a leaded zinc oxide by mixing the oxide with a small amount of an acidic phosphate and calcining the mixture in a furnace having a non-siliceous lining in accordance with the teaching of our invention.

Example I

A dry mechanical mixture was made up containing 0.28 part by weight of monosodium phosphate, $NaH_2PO_4.H_2O$, and 99.72 parts by weight of a leaded zinc oxide containing 35% of a basic lead sulfate.

This mixture was charged into a furnace and was calcined for about one hour at about 1200° F. The calcining furnace used had a steel exterior shell and was lined with alumina firebrick. Contact of siliceous materials with the leaded zinc oxide during calcination was therefore avoided.

Following the calcination, the product was discharged from the furnace and cooled. Examination of the calcined product showed that it had a soft, uniform texture and was free from grid and slag and large, coarse agglomerates. Moreover, the color of the leaded zinc oxide was remarkably improved by the calcining operation, the product being considerably whiter than before calcination.

For comparison with this improved product obtained according to a process of our invention, a portion of the original leaded zinc oxide was calcined in a firebrick furnace for one hour at about 1200° F. No phosphatic substance was present during the calcination. The calcined product had a coarse, gritty texture and contained slag particles of considerable size.

The next example shows that the processes of our invention can employ an alkaline phosphate as well as the acidic phosphate of Example I.

Example II

A dry mechanical mixture was made up containing 0.77 part by weight of trisodium phosphate, $Na_3PO_4.12H_2O$, and 99.23 parts by weight of a leaded zinc oxide containing 35% of basic lead sulfate.

This mixture was calcined for about one hour at about 1200° F. using a furnace similar in construction to the furnace of Example I, an alumina lining being used to avoid siliceous contamination of the product.

Following the calcination, the product was discharged from the furnace and cooled. Examination of the calcined product showed that it had a soft, uniform texture and was entirely free from grit and slag. The color of the calcined product was much whiter than the color of the leaded zinc oxide before calcining.

The following example illustrates the use of still another phosphatic substance, namely, a phosphate of an alkaline earth metal, in a process of our invention.

Example III

A dry mechanical mixture was made up containing 0.35 part by weight of mono-calcium phosphate, $CaHPO_4.2H_2O$, and 99.65 parts by weight of a leaded zinc oxide containing 35% of basic lead sulfate.

This mixture was calcined in a furnace wherein contact of the leaded zinc oxide with siliceous materials was avoided through the use of an alumina lining. Again, the temperature employed was about 1200° F. and the time about one hour.

The calcined product had a soft, uniform texture, was free from grit and slag, and had a color considerably whiter than the uncalcined material.

The following example shows the use of yet another phosphatic substance, diammonium phosphate, in a process of our invention.

*Example IV*

A dry mechanical mixture was made up containing 0.27 part by weight of diammonium phosphate, $(NH_4)_2HPO_4$, and 99.73 parts by weight of a leaded zinc oxide containing 35% of basic lead sulfate.

This mixture was calcined in an alumina-lined furnace for about one hour at about 1200° F.

Following the calcination, examination showed that the calcined product had a soft, uniform texture, was free from grit and slag, and had a color noticeably whiter than the uncalcined material.

The next example shows that our novel processes are applicable to the calcination of leaded zinc oxides having a different lead content from the particular formulation used in Examples I to IV. Whereas in Examples I to IV a 35% leaded zinc oxide was used, in the following example a 5% leaded zinc oxide is employed.

*Example V*

A dry mechanical mixture was made up containing 0.35 part by weight of mono-calcium phosphate, $CaHPO_4.2H_2O$, and 99.65 parts by weight of a leaded zinc oxide containing only 5% of basic lead sulfate.

This mixture was calcined in an alumina-lined furnace at 1200° F. for one hour.

The calcined product had a soft, uniform texture, was free from grit and slag, and had a color noticeably whiter than the uncalcined material.

To demonstrate the results obtainable by a process of the prior art, a portion of the original leaded zinc oxide containing 5% of basic lead sulfate, was calcined in a firebrick furnace for one hour at about 1200° F. No phosphatic substance was added before calcination. The calcined product had a gritty texture and contained particles of slag.

The next example shows that the success of our novel processes for calcining leaded zinc oxide is not dependent upon the dry mechanical mixing employed in Examples I to V for mixing the phosphatic substance with the leaded zinc oxide, and that wet mixing gives satisfactory results.

*Example VI*

A solution was made up containing 25.0 parts by weight of water and 0.1 part by weight of phosphoric acid, $H_3PO_4$. To this solution was added 99.9 parts by weight of a leaded zinc oxide containing 5% of basic lead sulfate. This mixture was stirred mechanically until thoroughly homogeneous and was then dried in an oven at 220° F. The dried mixture was calcined in an alumina-lined furnace for one hour at 1200° F.

Following calcination, examination of the calcined product showed that it had a soft, uniform texture, was free from grit and slag, and had a color remarkably whiter than the uncalcined material.

The next example shows that the use of a non-siliceous furnace for calcining leaded zinc oxide enables one to avoid slag formation even though no phosphatic substance is present.

*Example VII*

A portion of a leaded zinc oxide containing 5% basic lead sulfate was calcined in a chrome steel furnace at a temperature of about 1300° F. for one hour.

In this example the calcining furnace employed was made of a corrosion-resistant steel containing about 30% chromium. The furnace consisted of an externally-fired cylindrical receptacle mounted on trunnions in such a manner that it could be continuously revolved during the calcination. Baffle rods were fastened to the internal wall of the receptacle parallel to the axis of rotation.

During the calcination intimate contact of the leaded zinc oxide with the heated chrome steel shell was insured by continuous rotation of the shell. After calcining for one hour the product was discharged from the furnace and cooled.

Examination of the calcined product showed that it was free of slag and was not contaminated in any manner by the chrome steel furnace. Moreover, the leaded zinc oxide did not appear to have any corrosive effect on the chrome steel furnace. The color of the calcined product was noticeably whiter than the color of the uncalcined leaded zinc oxide.

It will, of course be understood that our invention is not limited to the particular formulations and conditions of the above examples, wide variations being possible without departing from the scope of our invention.

We have shown that leaded zinc oxides can be calcined without contamination by slag if the calcining furnace is provided with a non-siliceous refractory lining. In referring to a furnace lining we mean that portion of a furnace with which a leaded zinc oxide comes in contact during calcination. A non-siliceous furnace lining may, for instance, be made from such refractory materials as alumina or magnesia, or from corrosion-resistant and heat-resistant metals such as the chrome steel used in Example VII.

The phosphatic substance employed in our novel process for calcining leaded zinc oxide may be a phosphoric acid, a phosphate, or a substance capable of forming a phosphate under the conditions of the calcination. We have shown examples in which specific phosphates were used, but the operation of our invention is not limited to these particular phosphates. The amount of a phosphatic substance required to produce a remarkable texture improvement is often very small, as has been shown by Examples I to VI, above.

It is, of course, desirable to use only as much of a phosphatic substance as is required to give the desired improvement of texture of the calcined product, in order to avoid undue contamination of the pigment. The application of our invention is not limited to the use of any particular amount of phosphatic substance, however, since the amount used in each instance depends on the material used.

While in the above examples we have shown the advantages resulting from the application of our novel processes to the calcination of certain leaded zinc oxides which are representative of the products most familiar to the pigment industry, namely, those containing 5% and 35% of basic lead sulfates, it will be understood that improvements in the pigment properties of zinc oxides having other basic lead sulfate contents may also be effected by calcining them according to a process of our invention.

The time and temperature conditions required for the proper calcination of a leaded zinc oxide by one of our novel processes are about the same as hitherto employed in the art for calcining zinc oxide. The temperatures shown in the above examples, about 1200 and 1300° F. gave satisfactory results, but temperatures somewhat higher or somewhat lower can also be employed. The period of time allowed for calcination can also be varied considerably without materially affecting the quality of the product obtained by the process of our invention.

We claim:

1. In a process for producing a leaded zinc oxide having improved pigment properties, the step comprising calcining a mixture of a leaded zinc oxide and an inorganic phosphatic substance in a furnace having a non-siliceous refractory lining.

2. In a process for producing a leaded zinc oxide having improved pigment properties the step comprising calcining a leaded zinc oxide in a furnace having a non-siliceous refractory lining.

3. In a process for producing a leaded zinc oxide having improved pigment properties, the step comprising calcining a mixture containing leaded zinc oxide and an inorganic phosphatic substance the amount of phosphatic substance used not substantially exceeding that which lends improved texture to the leaded zinc oxide.

4. In a process for producing a leaded zinc oxide having improved pigment properties, the steps comprising making a mixture containing leaded zinc oxide and a small amount of an inorganic phosphatic substance and calcining the mixture in a furnace having a chrome steel lining.

5. In a process for producing a leaded zinc oxide having improved pigment properties, the steps comprising making a mixture containing about 99.9 parts by weight of a leaded zinc oxide and about 25 parts by weight of a solution containing about 24.9 parts by weight of water and about 0.1 part by weight of phosphoric acid, drying the mixture and calcining the dried mixture in a furnace having a non-siliceous lining.

6. In a process for producing a leaded zinc oxide having improved pigment properties, the steps comprising making a mixture containing leaded zinc oxide and a small amount of a inorganic phosphatic substance, charging the mixture into a furnace having a non-siliceous lining, and calcining the mixture at a temperature of about from 1100 to 1300° F.

7. In a process for producing a leaded zinc oxide having improved pigment properties, the step comprising calcining a mixture containing leaded zinc oxide and a phosphatic substance selected from the group consisting of phosphoric acid, calcium phosphates, ammonium phosphates, and sodium phosphates, the amount of phosphatic substance used not substantially exceeding that which lends improved texture to the leaded zinc oxide.

WORTHINGTON T. GRACE.
ALBERT H. RISTAU.